(12) United States Patent
Shpilyuck et al.

(10) Patent No.: US 12,236,265 B2
(45) Date of Patent: Feb. 25, 2025

(54) ERROR AVOIDANCE LOAD BALANCING ACROSS DISTRIBUTED CLUSTERED CONTAINERIZED ENVIRONMENTS

(71) Applicant: Dell Products L.P., Round Rock, TX (US)

(72) Inventors: Boris Shpilyuck, Ashdod (IL); Jehuda Shemer, Kfar Saba (IL); Igor Dubrovsky, Beer Sheva (IL)

(73) Assignee: DELL PRODUCTS L.P., Round Rock, TX (US)

( * ) Notice: Subject to any disclaimer, the term of this patent is extended or adjusted under 35 U.S.C. 154(b) by 592 days.

(21) Appl. No.: 17/565,406

(22) Filed: Dec. 29, 2021

(65) Prior Publication Data

US 2023/0205578 A1 Jun. 29, 2023

(51) Int. Cl.
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | | |
|---|---|---|---|---|
| 8,250,257 B1* | 8/2012 | Harel | ...................... | G06F 3/0659 711/114 |
| 10,289,538 B1* | 5/2019 | Dwivedi | ............. | G06F 11/0718 |
| 10,511,690 B1* | 12/2019 | Chatterjee | ............... | H04L 67/61 |
| 10,684,940 B1* | 6/2020 | Kayal | .................. | G06F 11/3664 |
| 10,938,691 B1* | 3/2021 | Bonas | ...................... | H04L 67/56 |
| 11,522,949 B1* | 12/2022 | Tummala | ................ | H04L 67/51 |
| 11,561,868 B1* | 1/2023 | Poornachandran | ... | G06F 11/165 |
| 2004/0109447 A1* | 6/2004 | Douglass | .............. | H04L 49/602 370/389 |
| 2017/0242784 A1* | 8/2017 | Heorhiadi | ........... | G06F 11/3684 |
| 2018/0034839 A1* | 2/2018 | Ahuja | .................. | H04L 63/1408 |
| 2018/0081983 A1* | 3/2018 | Carru | .................. | H04L 67/5682 |
| 2018/0270107 A1* | 9/2018 | Nassar | ................ | H04L 41/0677 |
| 2018/0270122 A1* | 9/2018 | Brown | .................... | H04L 67/30 |
| 2018/0285250 A1* | 10/2018 | Helsley | ............... | G06F 11/3409 |
| 2018/0307514 A1* | 10/2018 | Koutyrine | ........... | G06F 11/0706 |
| 2019/0028496 A1* | 1/2019 | Fenoglio | ............. | H04L 63/1425 |
| 2019/0057015 A1* | 2/2019 | Hassan | ................ | G06F 11/008 |

(Continued)

*Primary Examiner* — Adam Lee
(74) *Attorney, Agent, or Firm* — Amin, Turocy & Watson, LLP

(57) ABSTRACT

A system can determine respective health statuses for respective microservices of respective instances of a group of microservices. The system can monitor the requests to determine a correlation between respective requests of the requests and respective subgroups of microservices of the group of microservices that carry out the respective requests. The system can determine a subgroup of container clusters of container clusters that are available to serve a first request type, based on determining an intersection between the respective subgroups of microservices of the group of microservices that carry out the respective requests, and the respective health statuses for respective microservices of respective instances of the group of microservices. The system can, in response to receiving a first request of the first request type, assign, by a load balancer, the first request to be served by a first container cluster of the subgroup of container clusters.

20 Claims, 10 Drawing Sheets

(56) References Cited

U.S. PATENT DOCUMENTS

| | | | |
|---|---|---|---|
| 2019/0087178 A1* | 3/2019 | Buehler | G06F 9/5072 |
| 2019/0215239 A1* | 7/2019 | Li | H04L 41/0823 |
| 2019/0238399 A1* | 8/2019 | Perreira | H04L 41/0677 |
| 2019/0320038 A1* | 10/2019 | Walsh | G06F 16/9574 |
| 2019/0340059 A1* | 11/2019 | Bagarolo | G06F 8/71 |
| 2019/0347168 A1* | 11/2019 | Giannetti | G06F 11/1438 |
| 2020/0110667 A1* | 4/2020 | Al-Alem | G06F 11/1438 |
| 2020/0112497 A1* | 4/2020 | Yenumulapalli | H04L 43/10 |
| 2020/0167267 A1* | 5/2020 | Liu | G06F 11/3684 |
| 2020/0241944 A1* | 7/2020 | Derdak | G06F 9/547 |
| 2020/0259715 A1* | 8/2020 | Schermann | H04L 67/51 |
| 2020/0351392 A1* | 11/2020 | Bomma | H04L 67/60 |
| 2020/0366587 A1* | 11/2020 | White | H04L 43/50 |
| 2020/0366756 A1* | 11/2020 | Vittal | H04L 41/12 |
| 2020/0389517 A1* | 12/2020 | Eloy | G06F 9/505 |
| 2020/0412623 A1* | 12/2020 | Brown | H04L 41/5029 |
| 2020/0412624 A1* | 12/2020 | Brown | H04L 41/5022 |
| 2021/0109978 A1* | 4/2021 | Libby | G06F 9/547 |
| 2021/0133014 A1* | 5/2021 | Agarwal | G06F 11/0769 |
| 2021/0208961 A1* | 7/2021 | Dutta | G06F 11/0772 |
| 2021/0383439 A1* | 12/2021 | Edamadaka | G06F 9/547 |
| 2022/0050897 A1* | 2/2022 | Gaddam | G06N 3/006 |
| 2022/0066775 A1* | 3/2022 | Liu | G06F 9/5011 |
| 2022/0092077 A1* | 3/2022 | Darden | G06Q 10/10 |
| 2022/0147409 A1* | 5/2022 | Linck | G06F 11/0787 |
| 2022/0172067 A1* | 6/2022 | Kang | G06N 3/088 |
| 2022/0206782 A1* | 6/2022 | Guo | G06F 9/524 |
| 2022/0342718 A1* | 10/2022 | Iqbal | G06F 9/5027 |
| 2023/0040564 A1* | 2/2023 | Wang | G06F 18/29 |
| 2023/0195597 A1* | 6/2023 | Guzman | G06F 11/3656 |
| | | | 717/124 |
| 2023/0195601 A1* | 6/2023 | Poornachandran | G06N 20/00 |
| | | | 717/124 |

\* cited by examiner

ERROR AVOIDANCE LOAD BALANCING ACROSS DISTRIBUTED CLUSTERED CONTAINERIZED ENVIRONMENTS

BACKGROUND

Load balancing can generally comprise selecting a computing device to provide access to a resource, where there are multiple candidate computing devices configured to provide the access. In a system architecture that comprises microservice instances hosted in container clusters, and the microservice instances provide access to a resource, load balancing can comprise selecting a container cluster to provide the access.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can assign, by a load balancer, requests among container clusters, wherein the container clusters host respective instances of a group of microservices, and wherein multiple microservices of the group of microservices exchange information to provide a service in response to requests. The system can determine respective health statuses for respective microservices of respective instances of the group of microservices. The system can monitor the requests to determine a correlation between respective requests of the requests and respective subgroups of microservices of the group of microservices that carry out the respective requests. The system can determine a subgroup of container clusters of the container clusters that are available to serve a first request type, based on determining an intersection between the respective subgroups of microservices of the group of microservices that carry out the respective requests, and the respective health statuses for respective microservices of respective instances of the group of microservices. The system can, in response to receiving a first request of the first request type, assign, by the load balancer, the first request to be served by a first container cluster of the subgroup of container clusters.

An example method can comprise determining, by a system comprising a processor, respective health statuses for respective microservices of respective instances of a group of microservices, wherein respective container clusters host the respective instances of the group of microservices. The method can further comprise monitoring, by the system, requests to the group of microservices to determine a correlation between respective requests of the requests and respective subgroups of microservices of the group of microservices that carry out the respective requests. The method can further comprise determining, by the system, a subgroup of container clusters of the container clusters that are available to serve a first type of request, based on the respective subgroups of microservices of the group of microservices that carry out the respective requests, and the respective health statuses for respective microservices of respective instances of the group of microservices. The method can further comprise, in response to receiving a first request of the first type of request, assigning, by the system, the first request to be served by a first container cluster of the subgroup of container clusters.

An example non-transitory computer-readable medium can comprise instructions that, in response to execution, cause a system comprising a processor to perform operations. These operations can comprise determining respective health statuses for respective instances of microservices that operate on respective computing environments. These operations can further comprise determining a correlation between respective requests and which microservices of the microservices process the respective requests. These operations can further comprise determining a group of the computing environments that are available to process a first request type based on the health statuses and the correlation. These operations can further comprise, in response to receiving a first request having the first request type, assigning the first request to a first computing environment of the group of the computing environments.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
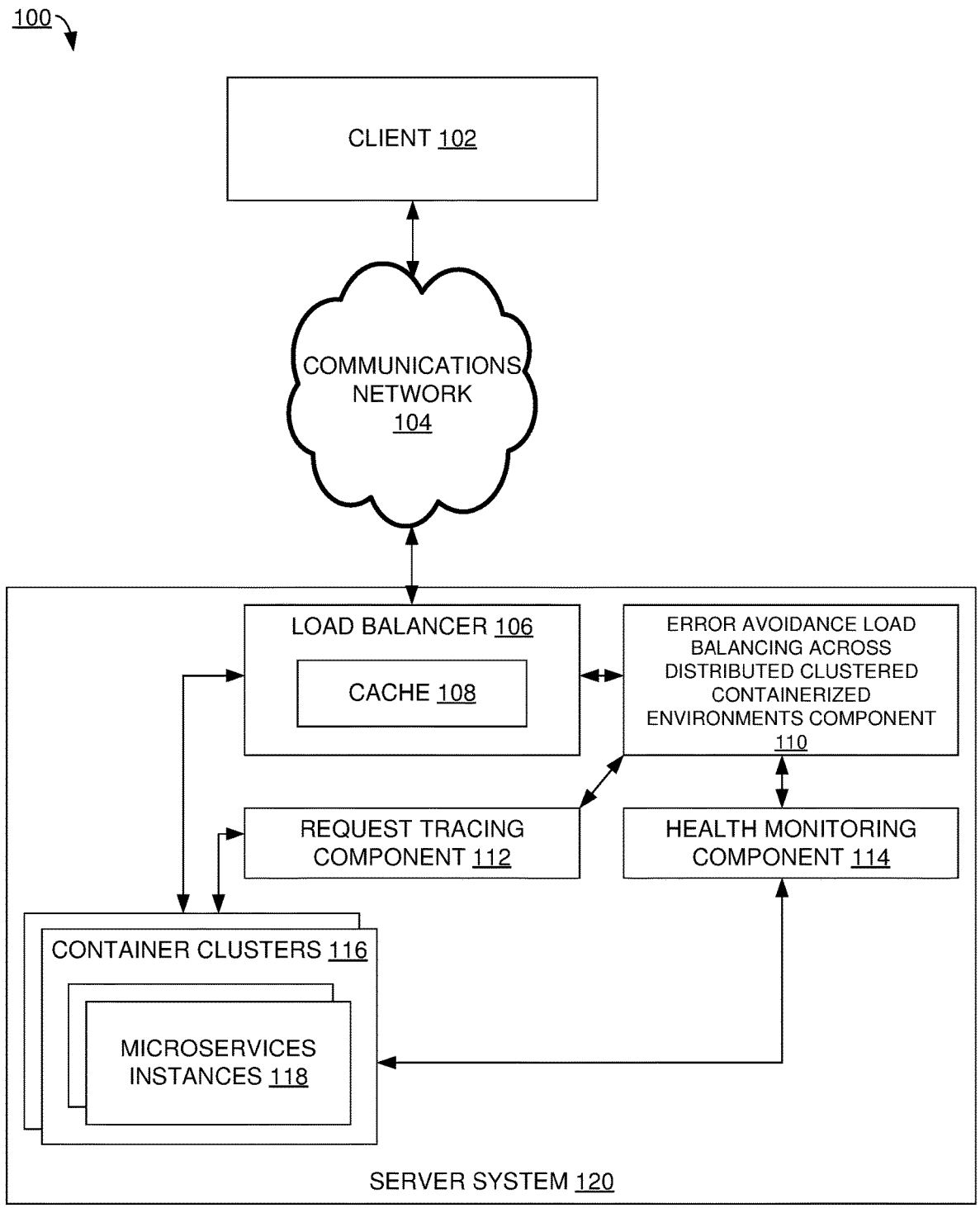
FIG. 1 illustrates an example system architecture that can facilitate error avoidance load balancing across distributed clustered containerized environments, in accordance with an embodiment of this disclosure.

Load balancers can determine availability of computing devices that are subject to load balancing by a connectivity status of a directly accessed service (e.g., in a microservices architecture, a microservice of a plurality of microservices that the load balancer directs a request to), or by measuring a latency of processing calls (to a first microservice in a microservices architecture). However, it can be that load balancers are unaware of issues deep within a service call chain or internal failures that can result in error conditions.

A solution to this problem with load balancers in a microservices architecture can be to use container health and connectivity graph analysis (where microservices are hosted in containers) to aggregate health information and detect issues deep within a call chain, and adjust load balancing to avoid forwarding calls to potentially error-prone targets.

Containerized environments can contain hundreds or thousands of microservices. To protect against data center failures, a service can be duplicated across multiple identical isolated containerized environments (which can be located in different datacenters), and a load balancer that distributes requests across the multiple containerized environments. In some examples, a multi-cloud can be implemented, where an application is distributed across multiple cloud locations of a single cloud vendor, or of multiple cloud vendors. In such examples, each location can comprise a datacenter (or have enough resources allocated to run the application), and a load balancer can balance between the locations.

Load balancers can test for connectivity and/or latency of their targets to determine if the targets are safe to be used for balancing traffic. This can mean that load balancing decisions are based on immediate connectivity to a first microservice in a microservice chain, or on a time or latency of successful calls. In complex, multi-clustered environments, this information can be superficial and not provide insight into whether a particular container cluster is successfully processing requests.

A request, after it has been forwarded by a load balancer to a specific container cluster, can pass between dozens of microservices within that cluster until the request is fulfilled. The request can fail where it passes through a microservice that has no healthy instances available, or where a system has an internal connectivity issue between microservices. An error result can then be propagated back to a load balancer, where the load balancer sends that error result onto the requestor (or, in some examples, retries the request with another container cluster). A load balancer can keep selecting the same path or container cluster for additional incoming requests, and can result in additional errors.

Where an unhealthy microservice instance is located deep within a chain of inter-microservice requests, then significant container cluster resources and time can be wasted on an attempt to handle the request with this cluster.

A solution to these problems of load balancing requests across container clusters of microservices can involve analyzing a microservice health graph within a container cluster to identify an inter-microservice request chain that corresponds to an external request that is received by a load balancer. This health information can be used to apply smart load balancing between container clusters. A load balancer can avoid sending additional requests to a target cluster with an unhealthy microservice that serves those requests until the health improves, which can avoid repeated errors. A container cluster that is selected by a load balancer for a particular request can be able to complete the request fully, without failing due to microservice health issues.

A problem with prior approaches can be that external application programming interface (API) calls that fail can consume significant resources. An external API call can pass through several microservices within a container cluster before reaching a microservice for which no healthy instances are available, and it can be that the API call can fail. Processing the API call with microservices before this point of failure can consume processing resources, memory, storage, and network resources without ultimately successfully fulfilling the external request of the API call. As a number of failing requests grows, an amount of corresponding wasted system resources can become more significant.

Another problem with prior approaches can be an increase in application response time. An external API call that fails after passing through several microservices can be forwarded by a load balancer to another container cluster, where the entire chain of microservice requests can begin again. This approach can be time consuming, and negatively impact user satisfaction.

Another problem with prior approaches can be that container clusters' health remediation systems do not provide a full solution. Some health remediation systems for containerized environments can automatically restore a microservice to a healthy state. However, regardless of how efficient such a system is, it can still take some time until the microservice is diagnosed as unhealthy and troubleshooted. During that time, long request chains can still fail, and thus waste system resources, slowing down the application's response time.

Some examples of the present techniques can incorporate three general parts: obtaining and normalizing microservice health information; identifying a microservice request chain resulting from particular API calls; and combining the health information and the request chain information to determine suitable clusters for particular API calls.

A health analyzer component can analyze microservice health information. In some examples, a health analyzer component can be part of a load balancer. In other examples, a health analyzer component can operate as an external component that interacts with a load balancer.

An example system architecture can comprise a load balancer and two container clusters. A health analyzer component can determine that cluster A has an unhealthy path for a request R, and can make this information known to the load balancer. A load balancer can receive an external request R, and discard cluster A for forwarding of R due to cluster A having an unhealthy microservice in the expected request chain. As a result, cluster B can be selected for the request, and the request can be forwarded to cluster B.

The health analyzer component can be in charge of obtaining and analyzing cluster health information, and making this information available to a load balancer to consume. In some examples, a load balancer can make a health analyzer component aware of request response codes so that the health analyzer component can target analysis for errored calls. For example, according to a Representational State Transfer (REST) approach, this response code can by a Hypertext Transfer Protocol (HTTP) error response code. Other types of response codes can be used with other types of approaches, such as a Simple Object Access Protocol (SOAP) approach, or an Extensible Markup Language (XML) Remote Procedure Call (RPC) approach. Continuing with a REST example, the error can be above HTTP. For example, the HTTP code can be 200, indicating success, but an application using HTTP can indicate that there was an error.

Where a health analyzer component is run internally as part of a load balancer, it can have access to this information. Where the health analyzer component runs external to the load balancer, there can be an interface between the load balancer and the health analyzer component to provide this information.

In some examples, information about each call is not provided as the call happens. Rather, it can be that successful call information can be sent as consolidated statistics. Then, errors can be conveyed more quickly so that the system can adjust to this new information relating to unhealthy microservice instances. This approach can result in performance of a load balancer not being degraded under normal conditions.

Microservice health information can be obtained and normalized as follows. A monitoring system can determine microservice health information based on a set of metrics. A health analyzer component can periodically obtain health information about each microservice instance, as well as connectivity between services.

Where, for a microservice X on a particular container cluster, all instances of microservice X are unhealthy, or connectivity to the instances are blocked, it can be considered that microservice X is generally unhealthy, and it can be added to an "unhealthy microservices" set for the container cluster. When it is later determined that microservice X now has healthy instances available on the computing cluster, it can be removed from the "unhealthy microservices" set.

In other examples, information about microservices health status can be received by push notifications rather than by periodically querying a monitoring system.

Examples of metrics can include, whether a microservice instance is running, a processor load associated with the microservice instance, a memory load associated with the microservice instance, an input/output (I/O) load associated with the microservice instance, disk usage of the microservice instance, a response time associated with the microservice instance, a number of dropped network packets by the microservice instance, and/or a number of items generated by the microservice instance during a particular time period.

In some examples, each microservice can be tagged as "healthy" or "not healthy" (or a Boolean value). Each metric (e.g., CPU load, I/O load, response time) can be many times a range parameter. Threshold values of these metrics or combinations of these metrics can be translated into a Boolean value. That is, "not healthy" can encompass more than microservices that are crashed or not running. Rather, in some examples, "not healthy" can indicate that the instances of a particular microservice are collectively impaired enough that they do not require a level of service required, or specified, for an application. Additionally, it can be that different container instances of one microservice are impaired in different ways, and that constitutes a microservice being "not healthy." That is, it can be that impairment does not need to be uniform across microservice instances of a container cluster for that microservice to be considered "not healthy."

In some examples, metrics for a given container cluster can be determined by a service operating on that container cluster, for each container cluster for which metrics are determined.

Identifying a microservices request chain for a particular external API call can be implemented as follows. A tracing system can trace a full request path of an API call. A tracing system can comprise a client-side library that intercepts calls that arrive to a microservice, adds a correlation ID (where one exists) to the request context, and propagates this correlation ID further down the request chain. In other examples, an application can add the correlation ID. A central tracing server can be contacted by a client-side library in order to save request information for further retrieval (alternatively, the information can be harvested from logs and traces). Eventually, a full request chain (e.g., involved microservices and corresponding Uniform Resource Locators (URLs)) can be obtained from a tracing server based on a correlation ID.

In some examples, specific calls can have more than one path through a service graph of microservices, and paths can split in parallel or conditionally. Path information can comprise a sub-graph of a cluster connectivity graph.

Information about paths can be accumulated over, rather than being established in real time for each call. Once a baseline is established, this baseline can be polled or adjusted over time, or on significant events, like upgrades that can change a path topology.

That is, per each external, previously-unencountered request R, a correlation ID Y can be generated by a load balancer in the beginning of a flow. A list of "involved microservices" {m1, m2, ... m(n)} can be retrieved from the tracing system based on the correlation ID.

This information can be stored by a health analyzer component in the form of a map, [R→{m1, m2, ... m(n)}]. In some examples, this information can be stored upon successful completion of the request R.

In some examples where there are multiple occurrences of R, with variants of the vector, the variants can be merged with a union of the microservices set.

Determining suitable clusters for each specific API call can be determined as follows. Where a load balancer receives a request R that it has encountered in the past, the request's corresponding list of "involved microservices {m1, m2, ... m(n)} can be fetched from a health analyzer component, and an intersection of involved microservices and unhealthy microservices can be determined, as per the below.

Where the load balancer has not encountered request R in the past, identifying a microservices request chain for a particular external API call can be performed, and the information for that request can be performed. Identifying the microservices request chain can be performed outside of a context of the request R, so it can be that performing this does not impact the request. Additionally, where the request R succeeds, the successful request can produce information used to create an entry for the request R. That is, the more the present techniques are implemented, it can be that more and more requests are identified and corresponding microservice request chains can be determined.

Then, an intersection of "involved microservices" and "unhealthy microservices" can be performed for each available container cluster. Clusters for which an intersection is not empty (that is, for which an involved microservice is unhealthy) can be discarded from a list of suitable clusters for servicing the particular request. Among remaining clusters, one can be selected based on a predetermined load balancing policy, such as round robin.

Where no suitable cluster is found, the load balancer can fail the request, without consuming additional cluster resources.

That is, an intersection between unhealthy microservices and microservices involved in processing a request can be determined per cluster, and this information can be used to determine whether a request will pass for a particular cluster. It can be that this information does not guarantee a successful call, because it can be that not all errors are health related. Rather, it can indicate that, where there is a health problem with an involved microservice on a cluster, the call will likely fail. Therefore, this approach can be used to improve load balancing by avoiding repeated calls to clusters that will fail on them.

Another approach for determining suitable clusters for each specific API call can be determined as follows. It can be that a list of involved microservices for a call seldom changes, so an intersection between involved microservices and unhealthy microservices yields different results where there are changes in the health status of a cluster.

Therefore, a health analyzer component can precompute an intersection between the involved microservices and the unhealthy microservices, and cache the results in a map R→{suitable clusters} for the load balancer to use. Some prior approaches populate a cache with information of immediate connectivity or latency, in contrast to this approach that includes information about the deep call chain.

This caching approach can be expressed with the following pseudocode:

for each request R in the map:

```
suitable = { }
foreach cluster C:
    if (Health_Info(C) intersection InvolvedMSs{R} = Empty)
        suitable += C
cached_map{R} = suitable
```

In this example pseudocode, Health_Info(C) indicates unhealthy microservices on cluster C, and where InvolvedMSs{R} indicates microservices involved in responding to request.

In some examples, the cache can be updated in some circumstances. The cache can be updated where health information for cluster C changes, and C can be added or removed from a list of suitable clusters for each request R. The cache can be updated when new requests are received for which involved microservices information is not yet known. The cache can also be updated when a request comes back with an error response that is internal. For example, when using HTTP error codes, this can be a 5XX error code (which can indicate a server problem). In this situation, a health analyzer component can refresh health statuses and re-determine suitable clusters for each request where a health status of a microservice of a cluster changes.

It can be appreciated that there can be examples that implement a cache, and that there can be other examples that omit the cache, and recalculate available clusters for each request.

The present techniques can be implemented to avoid wasting distributed clusters' resources on failing requests, and to reduce a response time of applications that run on a distributed cluster. In implementing the present techniques, a health analyzer component can generate a list of involved microservices by using correlation and trace information. An intersection between microservice health and microservices involved in responding to a request can be made to determine suitable candidate clusters for servicing a request. These intersections can be cached to facilitate efficient load balancing.

Example Architectures

FIG. 1 illustrates an example system architecture 100 that can facilitate error avoidance load balancing across distributed clustered containerized environments, in accordance with an embodiment of this disclosure.

As depicted, system architecture 100 comprises client computer 102, communications network 104, and server system 120. In turn, server system 120 comprises load balancer 106, cache 108, error avoidance load balancing across distributed clustered containerized environments component 110 (which can be referred to as a health analyzer component), request tracing component 112, health monitoring component 114, and container clusters 116 (which comprises microservices instances 118).

A container cluster of container clusters 116 generally comprises at least one computing node that is configured to host a set of containers (where a container generally comprises an isolated user-space instance hosted on an operating system that can host multiple containers). Container clusters 116 can comprise multiple of these container clusters, where each container cluster is configured to host its own set of containers.

Each container cluster of container clusters 116 can host a set of microservices instances 118. A microservice can comprise a component that exposes an application programming interface (API) that can be used by another microservice for communication. A group of microservices can communicate together to provide access to a computing resource. An example computing resource can be image processing or storage. In some examples, each container cluster of container clusters 116 can host instances of a set of microservices (e.g., microservices instances 118).

Server system 120 can provide access to computing resources to client computer 102, via communications network 104. Client computer 102 can originate a request to access those resources. This request can be received by server system 120. It can be that multiple container clusters of container clusters 116 are configured to process the request, via their respective microservices instances 118.

Load balancer 106 can receive the request originated by client computer 102, and select a container cluster of container clusters 116 to process the request. In doing so, load balancer 106 can implement a variety of load balancing techniques, such as assigning the request to a container cluster that currently has the most processing resources available of the container clusters, or by implementing a round robin approach, where load balancer 106 assigns one request to each container cluster in turn, then assigns a second request to each container cluster in turn, etc.

As part of load balancing, load balancer 106 can also determine which container clusters of container clusters 116 are currently able to process a particular type of request (because the container cluster hosts microservice instances that are used to process the request and that are currently able to do so). Load balancer 106 can assign a request from among those container clusters of container clusters 116 that are currently able to process a particular type of request.

Request tracing component 112 can determine which microservices are used to process particular requests. Health monitoring component 114 can determine health information for instances of microservices on container clusters 116.

This information from request tracing component 112 and health monitoring component 114 can be provided to error avoidance load balancing across distributed clustered containerized environments component 110, which can determine which container clusters of container clusters 116 has healthy microservice instances that are able to process particular request types. Error avoidance load balancing across distributed clustered containerized environments component 110 can store this information in cache 108, and load balancer 106 can use this information in cache 108 to make load balancing decisions.

In some examples, this information is not cached in cache 108, but can be recomputed each time a request is received.

Figure 10:
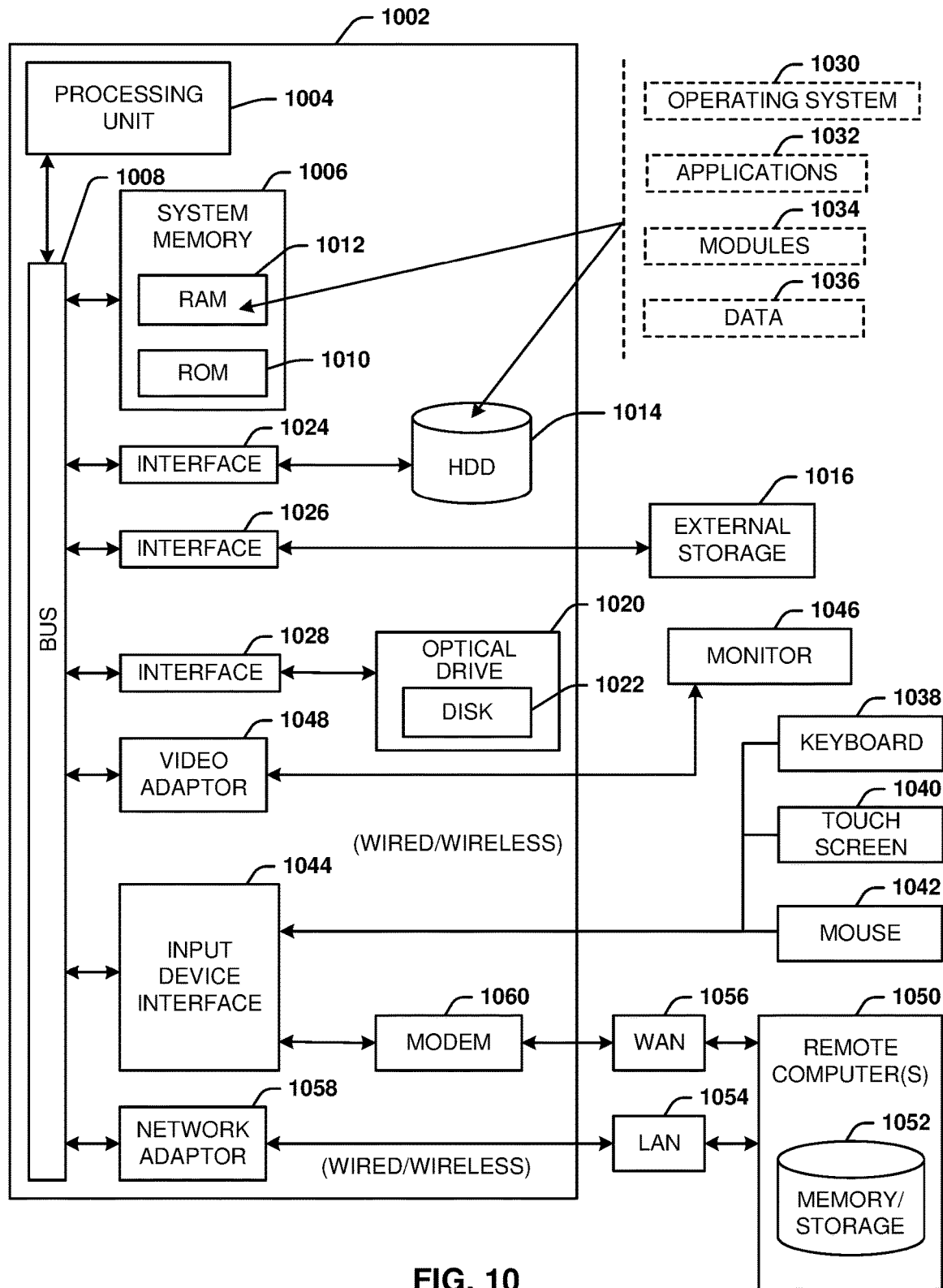
FIG. 10 illustrates an example block diagram of a computer operable to execute an embodiment of this disclosure.

Each of client computer 102 and/or server system 120 can be implemented with part(s) of computing environment 1000 of FIG. 10. Communications network 104 can comprise a computer communications network, such as the Internet.

Figure 7:
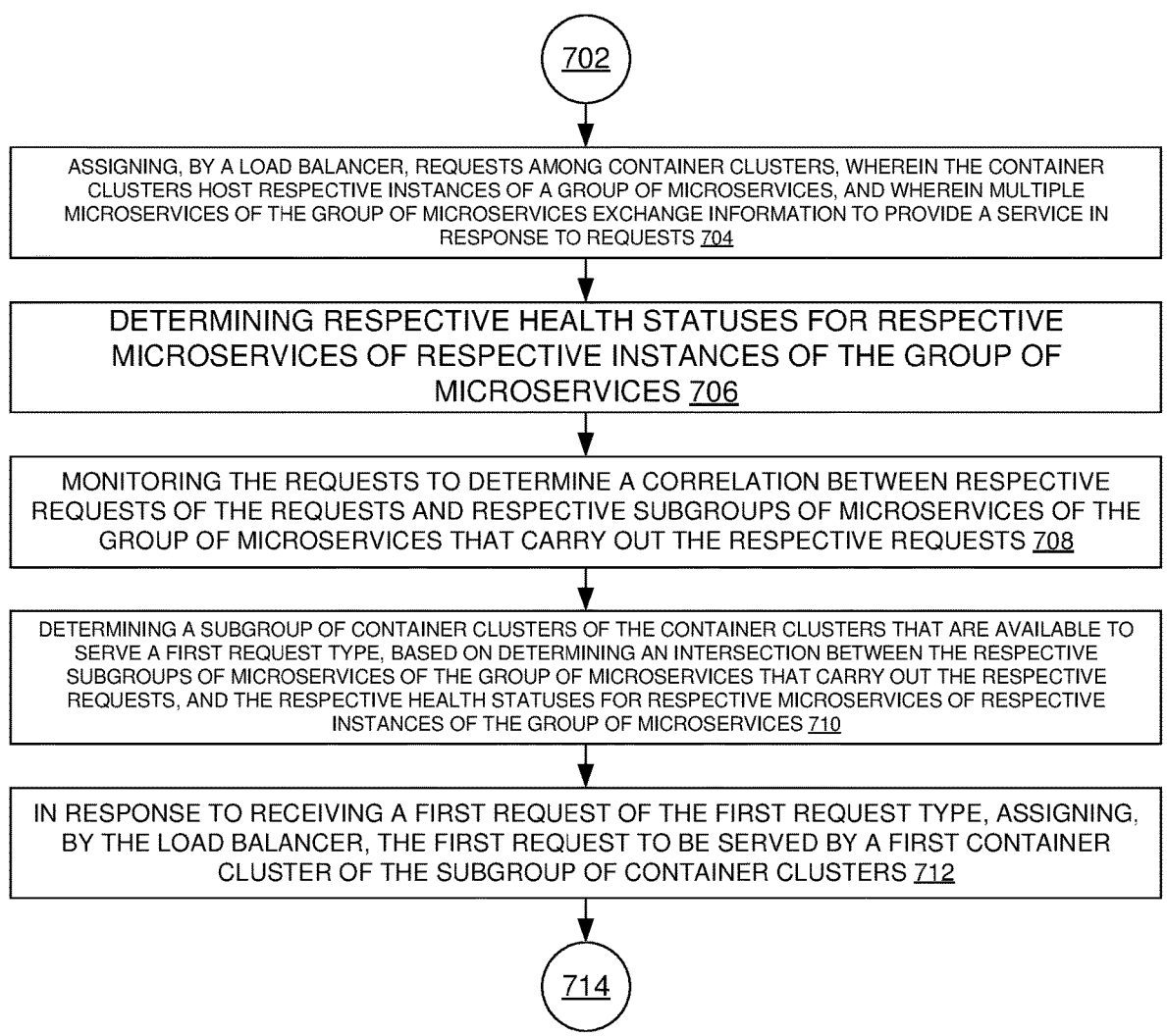
FIG. 7 illustrates an example process flow that can facilitate error avoidance load balancing across distributed clustered containerized environments, in accordance with an embodiment of this disclosure.
Figure 8:
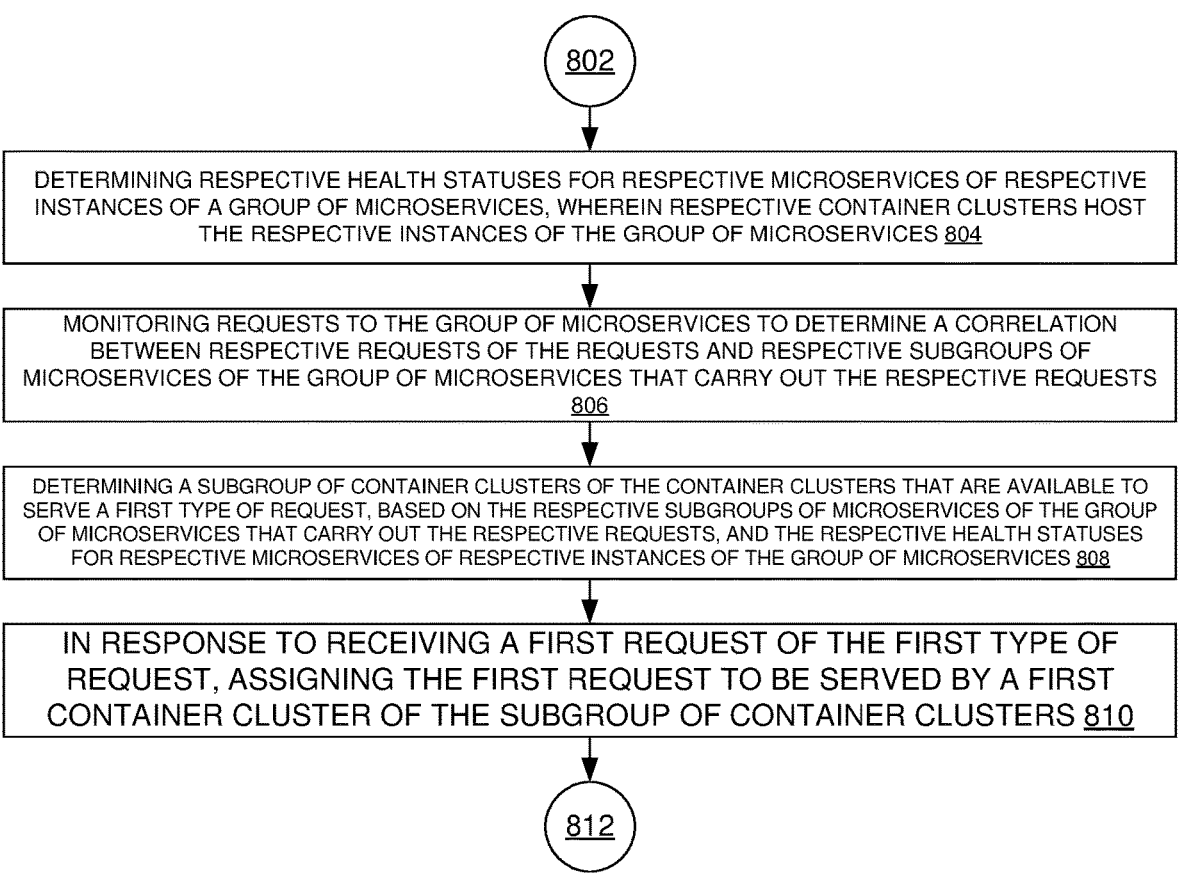
FIG. 8 illustrates another example process flow that can facilitate error avoidance load balancing across distributed clustered containerized environments, in accordance with an embodiment of this disclosure.
Figure 9:
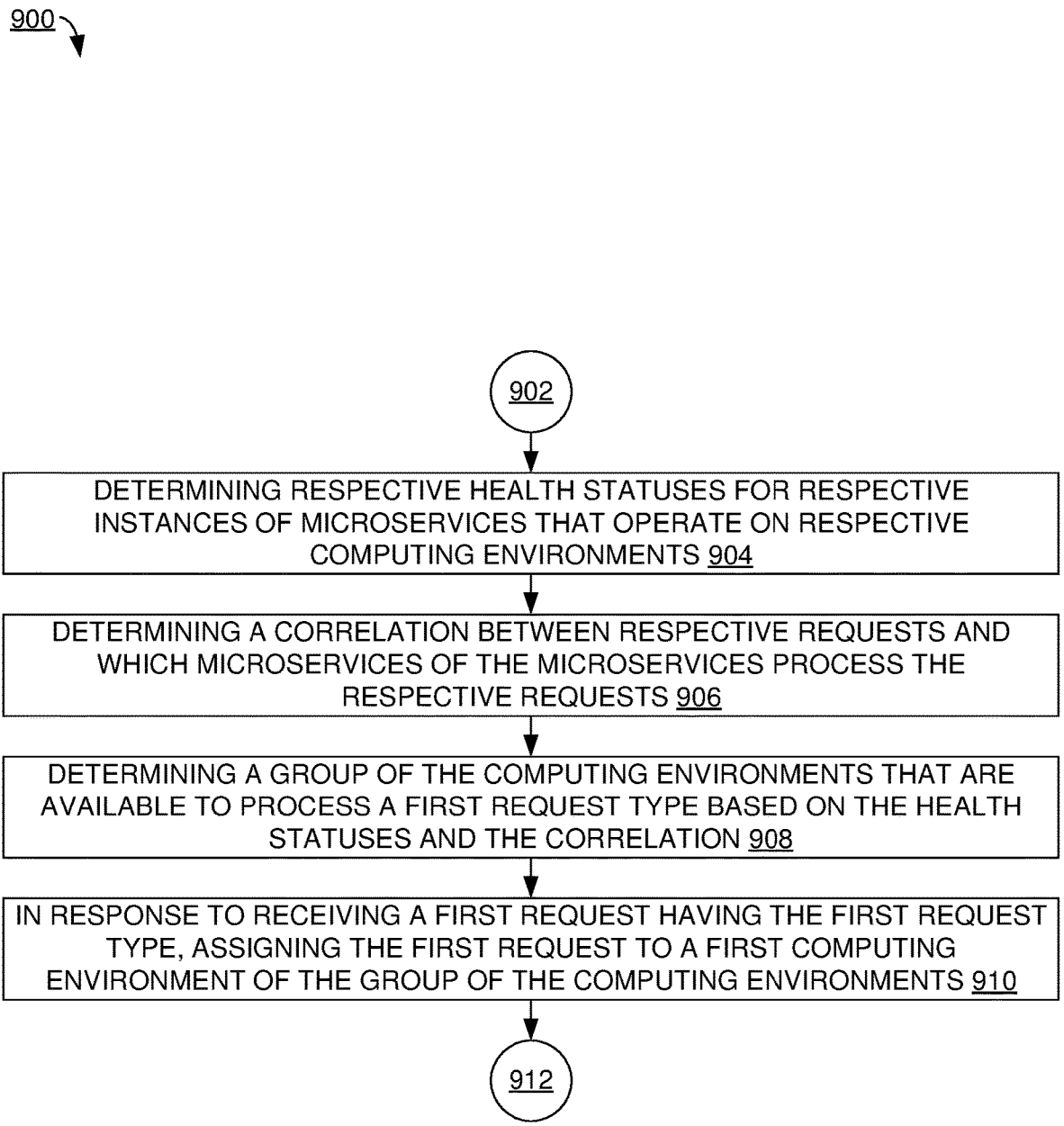
FIG. 9 illustrates another example process flow that can facilitate error avoidance load balancing across distributed clustered containerized environments, in accordance with an embodiment of this disclosure.

In some examples, error avoidance load balancing across distributed clustered containerized environments component 110 can implement part(s) of the process flows of FIGS. 7-9 to facilitate error avoidance load balancing across distributed clustered containerized environments.

It can be appreciated that this is an example system architecture that logically depicts various components, and that there can be other system architectures used to implement the present techniques. It can also be appreciated that examples herein describe container cluster environments, and that the present techniques can more generally be applied to microservice architectures.

Figure 2:
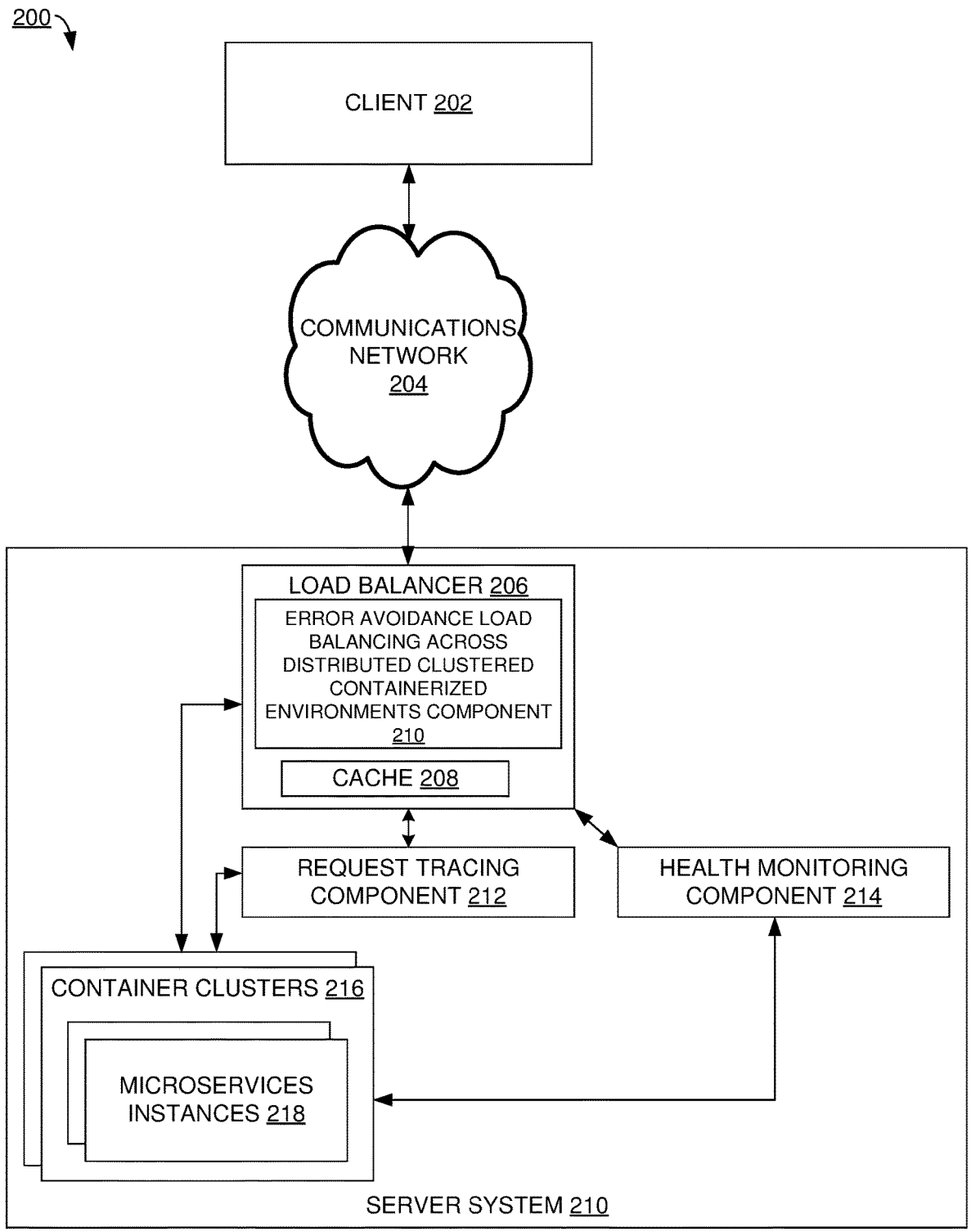
FIG. 2 illustrates another example system architecture that can facilitate error avoidance load balancing across distributed clustered containerized environments, in accordance with an embodiment of this disclosure.

FIG. 2 illustrates another example system architecture 200 that can facilitate error avoidance load balancing across distributed clustered containerized environments, in accordance with an embodiment of this disclosure.

As depicted, system architecture 200 comprises client computer 202 (which can be similar to client computer 102 of FIG. 1); communications network 204 (which can be similar to communications network 104); and server system 220 (which can be similar to server system 120). In turn, server system 220 comprises load balancer 206 (which can be similar to load balancer 106); cache 208 (which can be similar to cache 108); error avoidance load balancing across distributed clustered containerized environments component 210 (which can be similar to error avoidance load balancing across distributed clustered containerized environments component 110); request tracing component 212 (which can be similar to request tracing component 112); health monitoring component 114 (which can be similar to health monitoring component 114; container clusters 216 (which can be similar to container clusters 116; and microservice instances 218 (which can be similar to microservices instances 118).

System architecture 100 of FIG. 1 generally depicts error avoidance load balancing across distributed clustered containerized environments component 110 as being separate from load balancer 106. Then, a difference between system architecture 100 and system architecture 200 can be that, in system architecture 200, error avoidance load balancing across distributed clustered containerized environments component 210 is embodied within load balancer 206.

Figure 3:
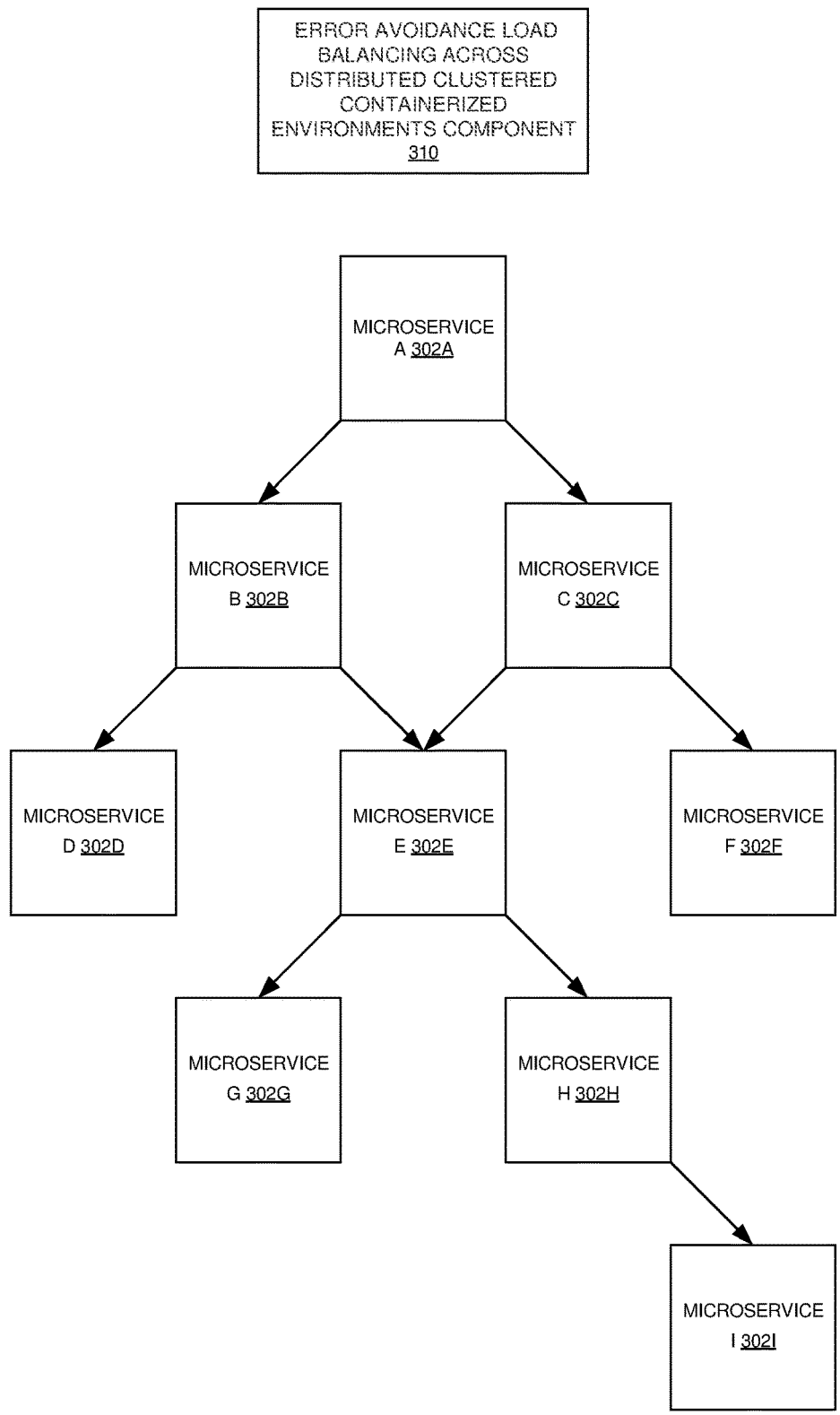
FIG. 3 illustrates an example system architecture of microservices hosted on a container cluster, and that can facilitate error avoidance load balancing across distributed clustered containerized environments, in accordance with an embodiment of this disclosure.

FIG. 3 illustrates an example system architecture 300 of microservices hosted on a container cluster, and that can facilitate error avoidance load balancing across distributed clustered containerized environments, in accordance with an embodiment of this disclosure. Parts of system architecture 300 can be implemented by system architecture 100 of FIG. 1. For example, the microservices of system architecture 300 can be microservices hosted by container clusters of container clusters 116.

System architecture 300 comprises error avoidance load balancing across distributed clustered containerized environments component 310, which can be similar to error avoidance load balancing across distributed containerized environments component 110 of FIG. 1. System architecture 300 also comprises a group of interconnected microservices-microservice A 302A, microservice B 302B, microservice C 302C, microservice D 302D, microservice E 302E, microservice F 302F, microservice G 302G, microservice H 302H, and microservice I 302I.

Figure 4:
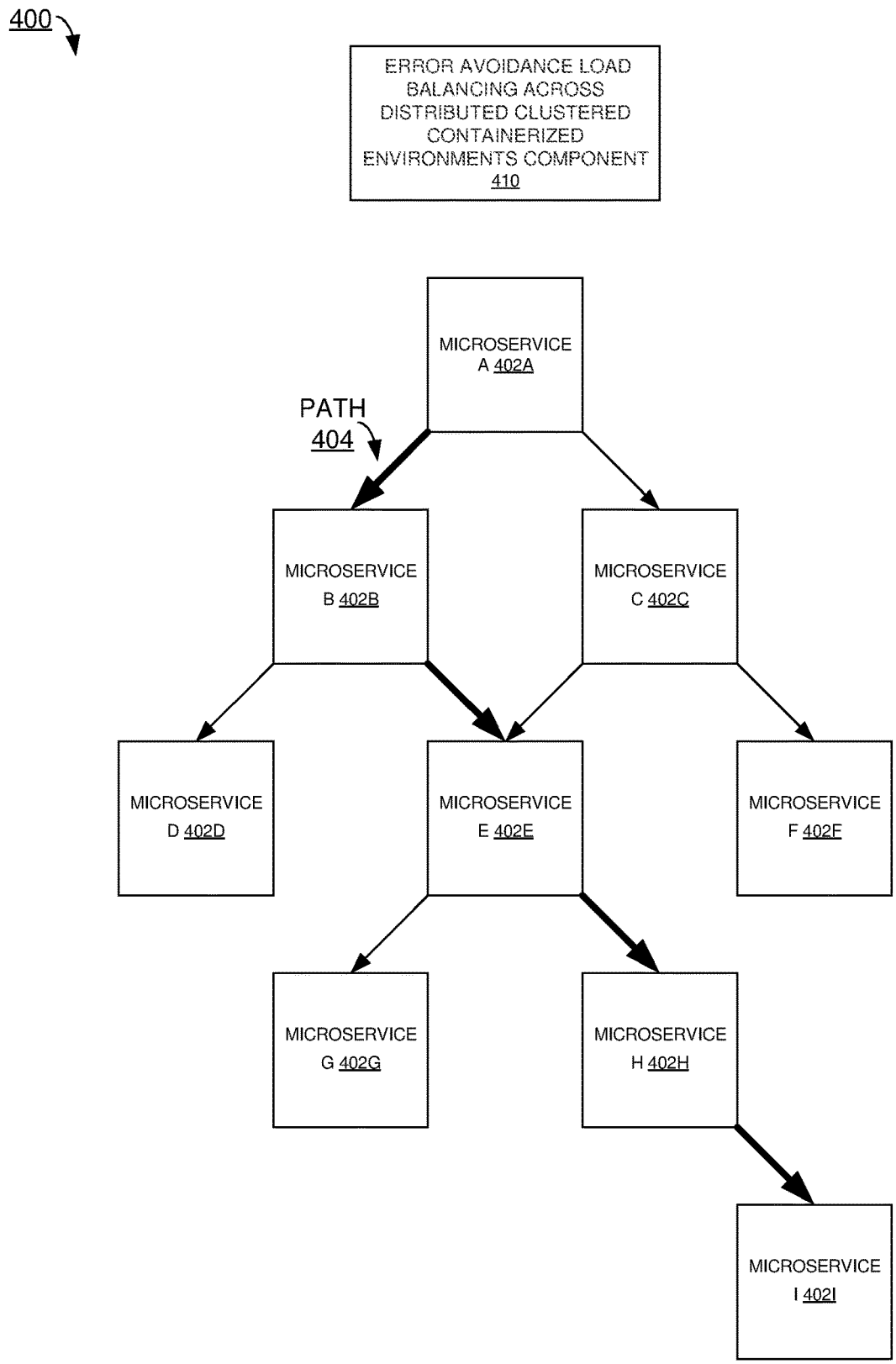
FIG. 4 illustrates another example system architecture of microservices hosted on a container cluster, where a request can be served by a subgroup of the microservices, and that can facilitate error avoidance load balancing across distributed clustered containerized environments, in accordance with an embodiment of this disclosure.

A request made to these microservices can be serviced by multiple of these microservices in concert, such as described with respect to FIG. 4. Where a microservice in the chain is non-functional, this can cause a request that is serviced by this microservice to fail. Where this non-functional microservice is located deep within a request chain, it can consume time and computing resources to determine that the request will fail, where the present techniques are not implemented.

FIG. 4 illustrates another example system architecture 400 of microservices hosted on a container cluster, where a request can be served by a subgroup of the microservices, and that can facilitate error avoidance load balancing across distributed clustered containerized environments, in accordance with an embodiment of this disclosure. Parts of system architecture 400 can be implemented by system architecture 100 of FIG. 1. For example, the microservices of system architecture 400 can be microservices hosted by container clusters of container clusters 116.

System architecture 400 comprises error avoidance load balancing across distributed clustered containerized environments component 410, which can be similar to error avoidance load balancing across distributed containerized environments component 110 of FIG. 1. System architecture 400 also comprises a group of interconnected microservices—microservice A 402A, microservice B 402B, microservice C 402C, microservice D 402D, microservice E 402E, microservice F 402F, microservice G 402G, microservice H 402H, and microservice I 402I. These microservices can be similar to microservice A 302A, microservice B 302B, microservice C 302C, microservice D 302D, microservice E 302E, microservice F 302F, microservice G 302G, microservice H 302H, and microservice I 302I, respectively.

In system architecture 400, there is path 404, which is a path through the microservices that servicing a particular request type takes. In path 404, the request is first processed by microservice A 402A, then microservice B 402B, microservice E 402E, microservice H 402H, and microservice I 408I, and in that order.

It can be that not all microservices of system architecture 400 are healthy, but a particular request type can still be processed. For example, microservice D 402D is outside of path 404, so if it is unhealthy on a cluster, the request that corresponds to path 404 can still be processed on that cluster.

Path 404 can be referred to as a microservice chain. Microservices deep within the microservice chain—e.g., microservice H 402H—can be unhealthy. But if a request that uses path 404 is directed to this group of microservices, it can be that the request is processed by several microservices—microservice A 402A, microservice B 402B, and microservice E 402E—before reaching microservice H 402H and an error occurring. That can result in consuming time and computing resources that could be conserved were knowledge that microservice H 402H was unhealthy was used in assigning the request to a cluster.

In some examples, multiple instances of a particular microservice can operate on a cluster. For example, multiple instances of microservice A 402A can operate on a cluster concurrently. A given microservice can be considered to be unhealthy for a cluster where all of its instances on a cluster are unhealthy.

Figure 5:
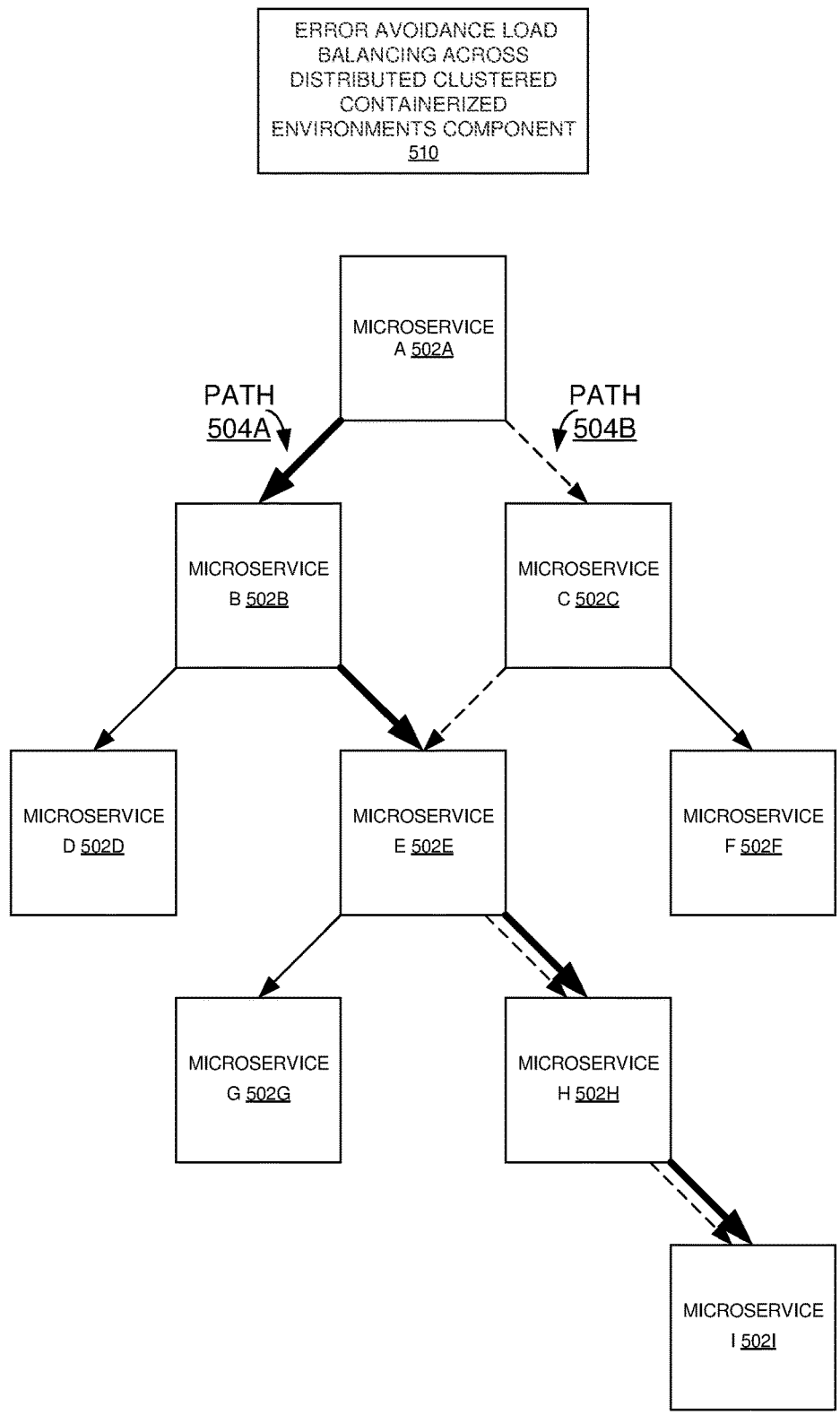
FIG. 5 illustrates another example system architecture of microservices hosted on a container cluster, where a request can be served by multiple subgroups of the microservices, and that can facilitate error avoidance load balancing across distributed clustered containerized environments, in accordance with an embodiment of this disclosure.

FIG. 5 illustrates another example system architecture 500 of microservices hosted on a container cluster, where a request can be served by multiple subgroups of the microservices, and that can facilitate error avoidance load balancing across distributed clustered containerized environments, in accordance with an embodiment of this disclosure. Parts of system architecture 500 can be implemented by system architecture 100 of FIG. 1. For example, the microservices of system architecture 500 can be microservices hosted by container clusters of container clusters 116.

System architecture 500 comprises error avoidance load balancing across distributed clustered containerized environments component 510, which can be similar to error avoidance load balancing across distributed clustered containerized environments component 110 of FIG. 1. System architecture 500 also comprises a group of interconnected microservices—microservice A 502A, microservice B 502B, microservice C 502C, microservice D 502D, microservice E 502E, microservice F 502F, microservice G 502G, microservice H 502H, and microservice I 502I. These microservices can be similar to microservice A 302A, microservice B 302B, microservice C 302C, microservice D 302D, microservice E 302E, microservice F 302F, microservice G 302G, microservice H 302H, and microservice I 302I, respectively.

In system architecture 500, there is path 504A, which is one path through the microservices that servicing a particular request type takes (and which can be similar to path 404 of FIG. 4). In path 504A, the request is first processed by microservice A 502A, then microservice B 502B, microservice E 502E, microservice H 502H, and microservice I 502I, and in that order.

In system architecture 500, there is also path 504B, which is another path through the microservices that servicing a request of the same time as for path 504A can take. In some examples, one request type can take multiple paths because of conditional or parallel processing of a request. In path 504B, the request is processed by microservice A 502A, then microservice C 502C, microservice E 502E, microservice H 502H, and microservice I 502I—in that order.

Where there are multiple paths that a request can take, a union of the two paths can be made, and that union be considered the set of microservices that need to be healthy on a cluster for the cluster to be considered to be available for to process requests of that type. Using the example of path 504A and path 504B, the union of their respective microservices is microservice A 502A, microservice B 502B, microservice C 502C, microservice E 502E, microservice H 502H, and microservice I 502I.

A reason for taking a union and then determining whether each microservice in the path is healthy can be that it is unknown which particular path a particular request will take. In that case, if a microservice in one path but not another path is unhealthy, there can still be a possibility that the request will reach the unhealthy microservice and fail. To avoid this possibility of failure, a cluster can be considered unavailable to service a request type where any microservice in any path for that request type is unhealthy.

Figure 6:
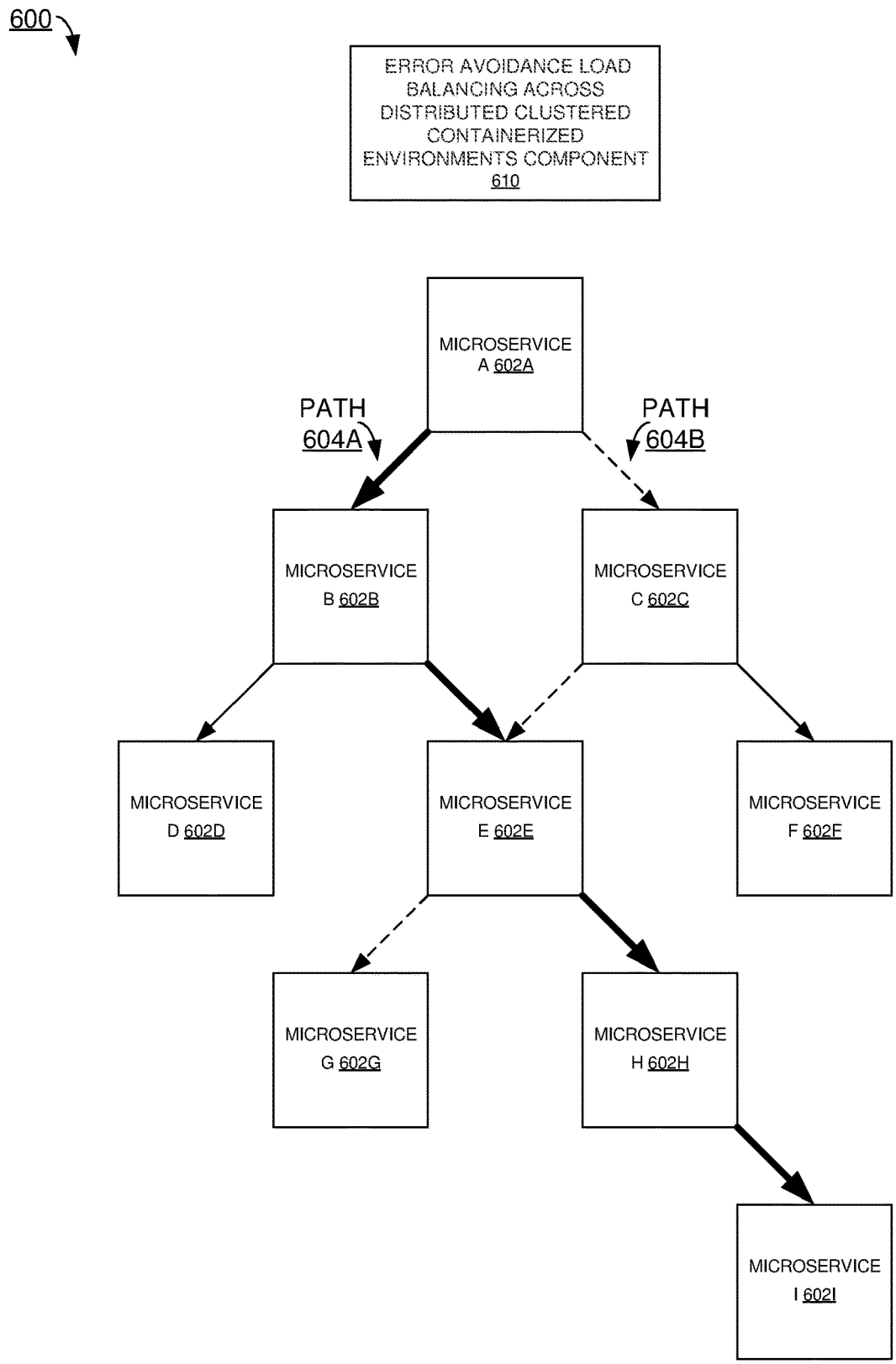
FIG. 6 illustrates another example system architecture of microservices hosted on a container cluster, where different request types can be served by different subgroups of the microservices, and that can facilitate error avoidance load balancing across distributed clustered containerized environments, in accordance with an embodiment of this disclosure.

FIG. 6 illustrates another example system architecture 600 of microservices hosted on a container cluster, where different request types can be served by different subgroups of the microservices, and that can facilitate error avoidance load balancing across distributed clustered containerized environments, in accordance with an embodiment of this disclosure. Parts of system architecture 600 can be implemented by system architecture 100 of FIG. 1. For example, the microservices of system architecture 600 can be microservices hosted by container clusters of container clusters 116.

System architecture 600 comprises error avoidance load balancing across distributed clustered containerized environments component 610, which can be similar to error avoidance load balancing across distributed clustered containerized environments component 110 of FIG. 1. System architecture 600 also comprises a group of interconnected microservices—microservice A 602A, microservice B 602B, microservice C 602C, microservice D 602D, microservice E 602E, microservice F 602F, microservice G 602G, microservice H 602H, and microservice I 602I. These microservices can be similar to microservice A 302A, microservice B 302B, microservice C 302C, microservice D 302D, microservice E 302E, microservice F 302F, microservice G 302G, microservice H 302H, and microservice I 302I, respectively.

In system architecture 600, there are two paths shown, one for each of two different request types. For one request type, there is path 604A, which is one path through the microservices that servicing a particular request type takes (and which can be similar to path 404 of FIG. 4). In path 604A, the request is first processed by microservice A 602A, then microservice B 602B, microservice E 602E, microservice H 602H, and microservice I 602I, and in that order.

For another request type in system architecture 600, there is also path 604B. In path 604B, the request is processed by microservice A 602A, then microservice C 602C, microservice E 602E, and microservice G 602G.

Path 604A and path 604B can include the same microservices (e.g., microservice A 602A). Additionally, since they include different microservices, there can be examples where a cluster is available to service a request type for path A 604A, but not available to service a request type for path B 604B. For example, where microservice C 602C is unavailable, then it can be that the cluster is not available to service a request type for path B 604B (which includes microservice C 602C), but is available to service a request type for path A 604A (which omits microservice C 602C).

Example Process Flows

FIG. 7 illustrates an example process flow 700 that can facilitate error avoidance load balancing across distributed clustered containerized environments, in accordance with an embodiment of this disclosure. In some examples, one or more embodiments of process flow 700 can be implemented by error avoidance load balancing across distributed clustered containerized environments component 110 of FIG. 1, error avoidance load balancing across distributed clustered containerized environments component 210 of FIG. 2, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, and/or process flow 900 of FIG. 9.

Process flow 700 begins with 702, and moves to operation 704. Operation 704 depicts assigning, by a load balancer, requests among container clusters, wherein the container clusters host respective instances of a group of microservices, and wherein multiple microservices of the group of microservices exchange information to provide a service in response to requests. That is, load balancing can be performed in an environment that comprises multiple container clusters which each host multiple microservices.

After operation 704, process flow 700 moves to operation 706.

Operation 706 depicts determining respective health statuses for respective microservices of respective instances of the group of microservices. That is, health information for the microservice instances on the clusters can be determined.

After operation 706, process flow 700 moves to operation 708.

Operation 708 depicts monitoring the requests to determine a correlation between respective requests of the requests and respective subgroups of microservices of the group of microservices that carry out the respective requests. That is, it can be determined which microservices service which types of requests.

After operation 708, process flow 700 moves to operation 710.

Operation 710 depicts determining a subgroup of container clusters of the container clusters that are available to serve a first request type, based on determining an intersection between the respective subgroups of microservices of the group of microservices that carry out the respective requests, and the respective health statuses for respective microservices of respective instances of the group of microservices. That is, available container clusters to service a type of requests can be determined, and an available container cluster can be identified by an intersection of unhealthy microservices on that container cluster and the microservices involved with servicing that request type being empty.

After operation 710, process flow 700 moves to operation 712.

Operation 712 depicts in response to receiving a first request of the first request type, assigning, by the load balancer, the first request to be served by a first container cluster of the subgroup of container clusters. That is, from the available container clusters for servicing the first request, the load balancer can perform load balancing to select a container cluster to service the request.

In some examples, operation 712 comprises caching, in a cache, a mapping between request types and corresponding subgroups of the container clusters that are able to serve corresponding request types, and wherein assigning the first request to be to be served by the first container cluster of the subgroup of container clusters comprises using the first request type of the first request to access an identifier of the first container cluster in the cache. That is, pre-computing suitable clusters can be performed, and a mapping of request R→{suitable clusters} can be stored in a cache that is then accessed to determine suitable clusters for a new request of the same type.

In some examples, operation 712 comprises, in response to determining that a health status for a first microservice of the first container cluster of the container clusters has changed, determining whether the first container cluster remains available to serve the first request type. That is, when the health status for a microservice on one cluster changes, availability for that cluster to serve different request types can be performed.

In some examples, operation 712 comprises, in response to determining that a health status for a second microservice of a second container cluster of the container clusters remains the same, refraining from determining whether the second container cluster remains available to serve the first request type. That is, when recomputing the availability of a particular cluster when a health status of its microservice changes, it can be that it is the availability of that particular cluster is recomputed, and not an availability of other clusters that have no change in microservice health status. In some examples, operation 712 comprises, in response to receiving a second request of a second request type, determining a second subgroup of container clusters of the container clusters that are available to serve the second request type, and storing an association between the second request type and the second subgroup of container clusters in a cache. That is, a cache can be updated when a new type of request comes in for which involved microservice information is not currently stored in the cache.

In some examples, operation 712 comprises, in response to receiving a third request of the second request type, assigning, by the load balancer and based on the cache, the third request to be served by a second container cluster of the second subgroup of container clusters. That is, after caching information about the second request type, when another request of that type is made, information about that request type can be retrieved from the cache rather than recomputing information about available clusters.

In some examples, operation 712 comprises, in response to determining, by the load balancer and based on the respective health statuses for respective microservices of respective instances of the group of microservices, that there is no container cluster of the container clusters available to serve a second request originated by a requestor, sending, by the load balancer and to the requestor, an indication that the second request fails. That is, when the load balancer determines that there is not a suitable cluster for the request, the load balancer can immediately tell the requestor that the request fails, rather than sending the request to a cluster where an initial microservice is functional, but another microservice deep in a request chain is nonfunctional (which causes the request to fail).

After operation 712, process flow 700 moves to 714, where process flow 700 ends.

FIG. 8 illustrates another example process flow 800 that can facilitate error avoidance load balancing across distributed clustered containerized environments, in accordance with an embodiment of this disclosure. In some examples, one or more embodiments of process flow 800 can be implemented by error avoidance load balancing across distributed clustered containerized environments component 110 of FIG. 1, error avoidance load balancing across distributed clustered containerized environments component 210 of FIG. 2, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, and/or process flow 900 of FIG. 9.

Process flow 800 begins with 802, and moves to operation 804. Operation 804 depicts determining respective health statuses for respective microservices of respective instances of a group of microservices, wherein respective container clusters host the respective instances of the group of microservices. In some examples, operation 804 can be implemented in a similar manner as operation 706 of FIG. 7.

In some examples, a first container cluster comprises multiple instances of a first microservice of the group of microservices, and operation 804 comprises determining a health status for the first microservice on the first container cluster as being unhealthy when each instance of the multiple instances of the first microservice is unhealthy. That is, a microservice for a cluster can be considered to be unhealthy where all instances of that microservice on the cluster are unhealthy (or there is a connectivity issue with each instance of that microservice on the cluster).

After operation 804, process flow 800 moves to operation 806.

Operation 806 depicts monitoring requests to the group of microservices to determine a correlation between respective requests of the requests and respective subgroups of microservices of the group of microservices that carry out the respective requests. In some examples, operation 806 can be implemented in a similar manner as operation 708 of FIG. 7.

After operation 806, process flow 800 moves to operation 808.

Operation 808 depicts determining a subgroup of container clusters of the container clusters that are available to serve a first type of request, based on the respective subgroups of microservices of the group of microservices that carry out the respective requests, and the respective health statuses for respective microservices of respective instances of the group of microservices. In some examples, operation 808 can be implemented in a similar manner as operation 710 of FIG. 7.

In some examples, operation 808 comprises determining that the first type of request is able to be served by multiple differing subgroups of microservices of the group of microservices that carry out the respective requests, and for determining the subgroup of container clusters of the container clusters that are available to serve the first type of request, determining that the first type of request is served by a union of the multiple differing subgroups of microservices. That is, where there are variants of groups of microservices used to process requests of a given type, a union of these groups of microservices can be taken, and this union can be considered to be the group of involved microservices in processing a request of that type.

After operation 808, process flow 800 moves to operation 810.

Operation 810 depicts in response to receiving a first request of the first type of request, assigning the first request to be served by a first container cluster of the subgroup of container clusters. In some examples, operation 810 can be implemented in a similar manner as operation 712 of FIG. 7.

In some examples, assigning the first request to be served by the first container cluster of the subgroup of container clusters comprises selecting the first container cluster from the subgroup of container clusters based on a load balancing policy of the system. That is, there can be two stages to selecting a container cluster. A first stage can be determining available container clusters for a particular request type. Then, from among the clusters within those available clusters, a particular cluster can be chosen to serve the request based on a load balancing policy, such as a round robin policy.

In some examples, operation 810 comprises consolidating successfully processed requests for an iteration of updating the respective health statuses for the respective microservices of the respective instances of the group of microservices. That is, rather than updating health statuses for microservices each time a request is successfully processed, these can be consolidated and processed in batches, or iterations. In some examples, consolidating the successfully processed requests comprises determining respective statistics regarding processing the successfully processed requests, and consolidating the respective statistics. That is, what can be consolidated is statistics about the successfully processed requests.

In some examples, operation 810 comprises performing an iteration of updating the respective health statuses for the respective microservices of the respective instances of the group of microservices in response to determining that an unsuccessfully processed request was not successfully processed, and independent of consolidating the unsuccessfully processed request with another request. That is, where there is an error in processing a request, that information can be used to immediately update health information. This can be implemented in contrast to an approach for consolidating statistics about successfully processed requests and batch processing them.

After operation 810, process flow 800 moves to 812, where process flow 800 ends.

FIG. 9 illustrates another example process flow 900 that can facilitate error avoidance load balancing across distributed clustered containerized environments, in accordance with an embodiment of this disclosure. In some examples, one or more embodiments of process flow 900 can be implemented by error avoidance load balancing across distributed clustered containerized environments component 110 of FIG. 1, error avoidance load balancing across distributed clustered containerized environments component 210 of FIG. 2, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, and/or process flow 800 of FIG. 8.

Process flow 900 begins with 902, and moves to operation 904. Operation 904 depicts determining respective health statuses for respective instances of microservices that operate on respective computing environments. In some examples, operation 904 can be implemented in a similar manner as operation 706 of FIG. 7.

In some examples, a health monitoring component performs the determining of the respective health statuses, and wherein a health analyzer component queries the health monitoring component for the respective health statuses, or receives push notifications from the health monitoring component the regarding respective health statuses. That is, a health monitoring component can determine health status information for microservice instances, and this information can be obtained from the health monitoring component by querying it, or by receiving push notifications from it.

In some examples, determining the respective health statuses comprises analyzing a response code by a first instance of a first microservice of the instances of microservices. That is, a health status can be based on an error status returned to a request, such as an error status in accordance with a REST approach, a SOAP approach, or a XML RPC approach.

After operation 904, process flow 900 moves to operation 906.

Operation 906 depicts determining a correlation between respective requests and which microservices of the microservices process the respective requests. In some examples, operation 906 can be implemented in a similar manner as operation 708 of FIG. 7.

In some examples, operation 906 comprises adding respective identifiers to the respective requests before the respective requests are processed by the microservices, and determining which microservices of the microservices receive communications that reference the respective identifiers. That is, a correlation ID can be added to a request, and used to trace movement of the request through microservices.

After operation 906, process flow 900 moves to operation 908.

Operation 908 depicts determining a group of the computing environments that are available to process a first request type based on the health statuses and the correlation. In some examples, operation 908 can be implemented in a similar manner as operation 710 of FIG. 7.

In some examples, the determining of the correlation, and the determining of the group of the computing environments that are available to process the first request type is performed by a health analyzer that is distinct from a load balancer that performs the assigning of the first request to the first computing environment. That is, there can be examples where the health analyzer and a load balancer are separate components.

In some examples, a load balancer that performs the assigning of the first request to the first computing environment also performs the determining of the correlation, and the determining of the group of the computing environments that are available to process the first request type. That is, in some examples, a load balancer can perform the role of the health analyzer.

After operation 908, process flow 900 moves to operation 910.

Operation 910 depicts, in response to receiving a first request having the first request type, assigning the first request to a first computing environment of the group of the computing environments. In some examples, operation 910 can be implemented in a similar manner as operation 712 of FIG. 7.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of client computer 102, and/or server system 120 of FIG. 1; and/or client computer 202, and/or server system 220 of FIG. 2.

In some examples, computing environment 1000 can implement one or more embodiments of the process flows of FIGS. 7-9 to facilitate error avoidance load balancing across distributed clustered containerized environments.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1015, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, execute operations comprising:
   receiving a plurality of requests of different request types;
   serving the requests of the plurality of requests with different container clusters, wherein the container clusters host respective instances of a group of microservices, and wherein multiple microservices of the group of microservices exchange information to provide a service in response to the requests;
   receiving respective health statuses of respective microservices of the respective instances of the group of microservices, wherein a correlation exists between respective requests of the requests and respective subgroups of microservices of the group of microservices, and wherein a subgroup of container clusters of the container clusters is available to serve a first request type based on the respective subgroups of microservices of the group of microservices and the respective health statuses for respective microservices of respective instances of the group of microservices;
   caching a mapping between the request types and corresponding subgroups of the container clusters that are able to serve the request types in a cache;
   receiving a subsequent request of the a second request type; and
   sending an indication of failure of the subsequent request when there is no container cluster of the container clusters available to serve the subsequent request based on the cached mapping and the respective health statuses of the respective microservices of the respective instances of the group of microservices.

2. The system of 1, wherein the operations further comprise:
   retrieving an identifier of a first container cluster in the cache using the first request type.

3. The system of 1, wherein the respective container clusters are available to serve the requests based on the respective health statuses.

4. The system of 3, wherein, when a respective health status for a respective microservice of a respective container cluster of the container clusters remains the same, the availability of the respective container cluster remains unchanged.

5. The system of 1, wherein respective availabilities of the container clusters to serve the requests are based on respective latencies of the exchanged information.

6. The system of 5, wherein the operations further comprise:
   restoring any microservice in an unhealthy state to a healthy state.

7. The system of 1, wherein the respective health statuses are based on different metrics and thresholds.

8. A method, comprising:
   receiving requests of different request types;
   serving the requests with different container clusters, wherein the container clusters host respective instances of a group of microservices, and wherein multiple microservices of the group of microservices exchange information to provide a service in response to the requests;
   receiving respective health statuses of respective microservices of the respective instances of the group of microservices,
      wherein a correlation exists between respective requests of the requests and respective subgroups of microservices of the group of microservices, and
      wherein a subgroup of container clusters of the container clusters is available to serve a first request type based on the respective subgroups of microservices of the group of microservices and the respective health statuses for respective microservices of respective instances of the group of microservices;

caching a mapping between the request types and corresponding subgroups of the container clusters that are able to serve the request types in a cache;

receiving a subsequent request of a second request type; and sending an indication that the subsequent request fails when there is no container cluster of the container clusters available to serve the subsequent request based on the cached mapping and the respective health statuses of the respective microservices of the respective instances of the group of microservices.

9. The method of 8, further comprising:
retrieving an identifier of a first container cluster in the cache using the first request type.

10. The method of 8, wherein the respective container clusters are available to serve the requests based on the respective health statuses.

11. The method of 10, wherein, when a respective health status for a respective microservice of a respective container cluster of the container clusters remains the same, the availability of the respective container cluster remains unchanged.

12. The method of 8, wherein respective availabilities of the container clusters to serve the requests are based on respective latencies of the exchanged information.

13. The method of 12, further comprising:
restoring any microservice in an unhealthy state to a healthy state.

14. The method of 8, wherein the respective health statuses are based on different metrics and thresholds.

15. A non-transitory computer-readable medium comprising instructions that, in response to execution, cause a system comprising at least one processor to perform operations, comprising:

receiving requests of different request types;

serving the requests with different container clusters, wherein the container clusters host respective instances of a group of microservices, and wherein multiple microservices of the group of microservices exchange information to provide a service in response to the requests;

receiving respective health statuses of respective microservices of the respective instances of the group of microservices,
wherein a correlation exists between respective requests of the requests and respective subgroups of microservices of the group of microservices, and
wherein a subgroup of container clusters of the container clusters is available to serve a first request type based on the respective subgroups of microservices of the group of microservices and the respective health statuses for respective microservices of respective instances of the group of microservices;

caching a mapping between the request types and corresponding subgroups of the container clusters that are able to serve the request types in a cache;

receiving a subsequent request of a second request type; and sending an indication that the subsequent request fails when there are no container clusters available to serve the subsequent request based on the cached mapping and the respective health statuses of the respective microservices of the respective instances of the group of microservices.

16. The non-transitory computer-readable medium of 15, wherein the operations further comprise:
retrieving an identifier of a first container cluster in the cache using the first request type.

17. The non-transitory computer-readable medium of 15, wherein the respective container clusters are available to serve the requests based on the respective health statuses.

18. The non-transitory computer-readable medium of 17, wherein, when a respective health status for a respective microservice of a respective container cluster of the container clusters remains the same, the availability of the respective container cluster remains unchanged.

19. The non-transitory computer-readable medium of 15, wherein respective availabilities of the container clusters to serve the requests are based on respective latencies of the exchanged information.

20. The non-transitory computer-readable medium of 19, wherein the operations further comprise:
restoring any microservice in an unhealthy state to a healthy state.

* * * * *